Aug. 27, 1935. B. LOEFFLER 2,012,613
THERMOSTATICALLY CONTROLLED OIL COOLING SYSTEM
Filed April 9, 1930
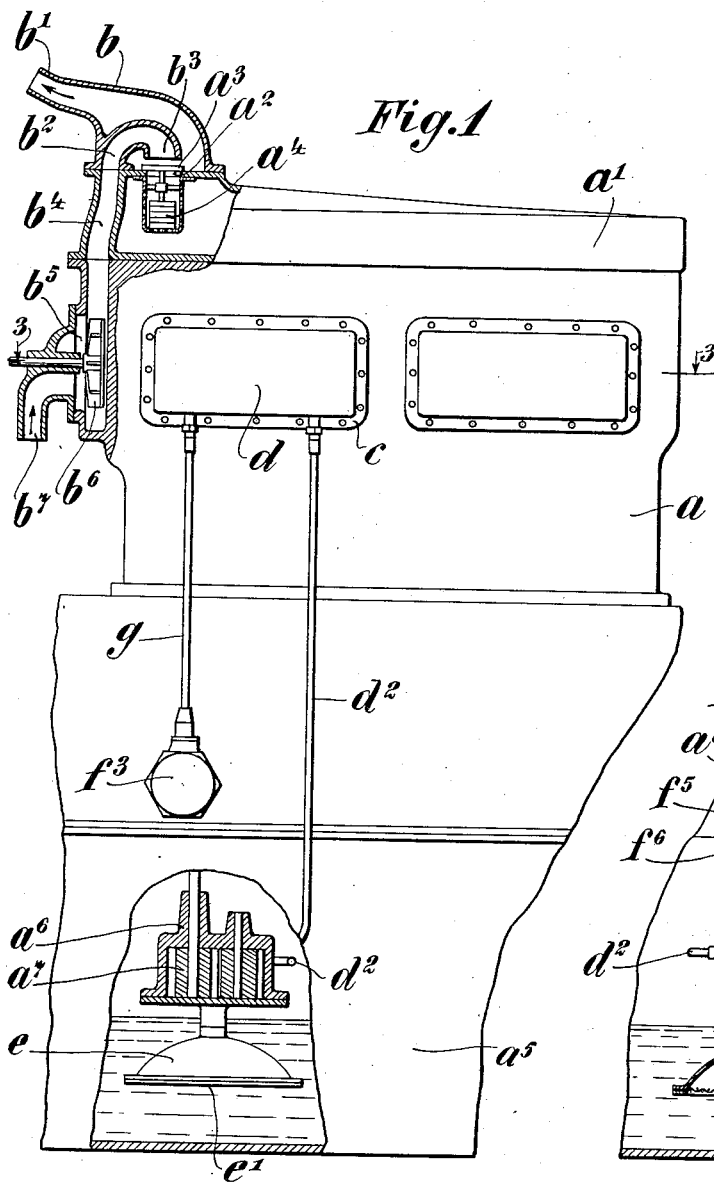
INVENTOR
Bruno Loeffler,
BY Redding, Greeley, O'Shea & Campbell
HIS ATTORNEYS Patented Aug. 27, 1935

2,012,613

UNITED STATES PATENT OFFICE 2,012,613

THERMOSTATICALLY CONTROLLED OIL COOLING SYSTEM

Bruno Loeffler, Plainfield, N. J., assignor to International Motor Company, New York, N. Y., a corporation of Delaware Application April 9, 1930, Serial No. 442,848

1 Claim. (Cl. 123—196)

The present invention relates to cooling systems for lubricating oil and embodies, more specifically, an improved cooling device for the lubricating systems of motor vehicles.

It is a matter of common knowledge, under certain conditions of operation, that the lubricating oil of a motor vehicle becomes overheated and its lubricating properties greatly impaired. For example, it is undesirable to permit the temperature of the lubricating oil of an internal combustion engine to exceed 180° Fahrenheit. Frequently, under certain operating conditions, the oil exceeds this temperature and damages the bearings of the engine.

In the device described herein, means is shown for maintaining the lubricating oil of an internal combustion engine below a predetermined maximum temperature at the same time providing a means for rapidly heating the oil when the engine is started, thus reducing its viscosity and bringing it into the desired temperature range rapidly.

An object of the invention, accordingly, is to provide a cooling system for maintaining lubricating oil below a predetermined maximum temperature.

A further object of the invention is to provide a system of the above character by means of which the cooling fluid of an internal combustion engine is utilized to preserve a desired temperature range in the lubricating oil thereof.

A further object of the invention is to provide a system of the above character by means of which the lubricating oil of an internal combustion engine may be rapidly heated during the starting of the engine in order that the oil may attain the desired viscosity under normal operating conditions.

A further object of the invention is to provide a cooling mechanism for lubricating oil, wherein the cooling fluid of an internal combustion engine is utilized to preserve the temperature of the lubricating oil to a value within a desired range of temperatures.

Further objects, not specifically enumerated above, will be apparent as the invention is described in greater detail in connection with the accompanying drawing, wherein:

Figure 1 is a view in side elevation, partly broken away and in section, showing an oil cooling system constructed in accordance with the present invention.

Figure 2 is a view in section, taken through a portion of an internal combustion engine, and showing a cooling system constructed in accordance with the present invention.

Figure 3 is a view in section, taken on line 3—3 of Figure 1, and looking in the direction of the arrows.

Referring to the above drawing, $a$ designates an internal combustion engine provided with a head $a'$. The head $a'$ is hollow and normally carries a cooling fluid, the flow of which will be described hereinafter. An aperture $a^2$ is provided in the head, valve $a^3$ being mounted therein to close the aperture $a^2$ in accordance with the temperature of the cooling medium, as responded to by a thermostatic device $a^4$.

At one end of the head $a'$, and over the aperture $a^2$, a fitting $b$ is provided, a duct $b'$ being formed in the fitting to carry the cooling medium away from the head and return the same to the radiator or other cooling device utilized. A duct $b^2$ is formed in the fitting and terminates in a port $b^3$, disposed immediately above the valve $a^3$. Duct $b^3$ communicates with a duct $b^4$ which communicates with a pump chamber $b^5$, within which a centrifugal pump $b^6$ is disposed. This pump is driven in the usual manner and pumps a cooling medium from the radiator, or other cooling means, through the duct $b^7$ and into the pump chamber, the flow of cooling medium, when the engine is cold, being through ducts $b^4$, $b^2$, and $b'$ to the radiator. This flow takes place during starting of the engine when the cooling medium is cold and the thermostatic valve $a^3$ is moved into the position shown in Figure 1. After the engine has heated up, the thermostatic valve $a^3$ opens to close the port $b^3$ and open the aperture $a^2$. The cooling medium is now by-passed through the duct $b^8$ and into the cooling jackets surrounding the cylindrical walls and heads. From these jackets the cooling medium flows through the head $a'$ and aperture $a^2$ to the duct $b'$ and radiator, as described above.

Within a water manifold $c$, communicating with the jackets and duct $b^8$, a heat transfer device $d$ is provided for effecting a heat transfer between the engine cooling medium and the oil of the lubricating system for the engine. This device is formed with channels $d'$ through which the cooling medium from duct $b^8$ may flow. A suitable conduit $d^2$ returns the oil from the heat transfer mechanism $d$ to a pump chamber formed in a reservoir provided in the crank case $a^5$ of the engine.

Within the crank case a fitting $a^6$ is formed, a pump chamber $a^7$ being provided in the fitting, as shown in Figure 2. Pump $a^8$ is mounted within the chamber $a^7$ and is driven by means of a gear $a^9$ which is driven from the engine in a well known fashion. A bell shaped fitting e, provided with a screening device e', is mounted upon the fixture $a^6$ and serves as an intake for the pump $a^8$. The lubricant which is drawn through the screening device is thus pumped through the chamber $a^7$ and into duct $a^{10}$ to lubricate the engine bearings in a well known fashion.

Communicating with the duct $a^{10}$, is a port $f$ which, in turn, communicates with a chamber $f'$ formed within an extension $f^2$ upon the engine casting. The extension $f^2$ is threaded and receives a cap $f^3$ which serves as a seat for spring $f^4$. A cylindrical valve $f^5$ is snugly fitted into the port $f$ and formed with apertures $f^6$ which are normally closed by the walls of the port. A cup shaped recess $f^7$ is formed on the valve and seats the spring $f^4$, thus normally maintaining the valve in the position shown in Figure 2. Pipe $g$ communicates between the chamber $f'$ and the heat transfer device $d$.

The operation of the device described above will be readily apparent since the pressure relief valve $f^5$ will normally be seated and closed. When the engine and lubricating oil are cold, the pressure relief valve permits the excess oil to pass through the device $d$. During starting the engine heats up rapidly since the flow of the cooling medium is by-passed through duct $b^4$. The cooling fluid around the heat transfer device $d$ thus becomes rapidly heated and the oil in such device correspondingly heated. In this manner, the lubricating oil will be heated during starting of the engine to improve the lubrication at such time.

After reaching a predetermined temperature the cooling medium causes the thermostatic valve $a^3$ to close port $b^3$ and force the cooling medium through the manifold $c$. The cooling medium about the heat transfer device $d$ thus starts to circulate freely and cool the lubricant within such device. It will thus be seen that the lubricant will be effectively cooled, the pressure of the oil within duct $a^{10}$ unseating valve $f^5$ and forcing a portion of the lubricant through the heat transfer device $d$.

To facilitate the operation of the above mechanism, the oil cooler or heat transfer device should be of a relatively large capacity in order that a large surface may be exposed to the cooling medium within the water manifolds. Furthermore, a relatively large amount of oil should by-pass the pressure relief valve in order to exert a proper influence upon the temperature of all of the oil within the reservoir.

From the foregoing, it will be seen that the lubricating oil will be heated when it is below a predetermined temperature and cooled when it approaches a predetermined maximum temperature. There thus results a thermostatic control of the cooling of the oil through the thermostatic control of the temperature of the cooling medium of the internal combustion engine. There will be no appreciable pressure in the heat transfer device since the flow therethrough is controlled by the pressure relief valve which reduces the pressure in the pipes $g$ and $d$ materially. The cooling system for the oil is thus in parallel with the pressure system and a leak or rupture of the cooling system will thus not impair the lubrication of the engine as it would if the systems were in series since the pressure of the lubricant at the bearings will be preserved.

While the invention has been described with specific reference to the accompanying drawing, it is not to be limited, save as defined in the appended claim.

I claim as my invention:

An oil cooling system for internal combustion engines having a cooling system, a pressure lubrication system, a source of lubricant and a pump for creating a flow of lubricant, the system comprising a heat transfer device mounted on the engine in heat transfer relationship with the engine cooling system, means including conduits forming a fluid path in parallel with a portion of the engine cooling system to direct the fluid to the heat transfer device, means including conduits forming a fluid path in parallel with a portion of the lubrication system to direct lubricant from the lubrication system to the heat transfer device and return the same to the lubrication system, a pressure responsive valve in the conduits forming the last named parallel fluid path to retard the flow of lubricant therethrough, and means in the cooling system and responsive to the temperature of the cooling fluid to cause the fluid to heat the lubricant when the temperature of the engine cooling fluid is below the predetermined value and cool the lubricant when the temperature of the fluid is above a predetermined value.

BRUNO LOEFFLER.